(12) United States Patent
Beuschel et al.

(10) Patent No.: US 12,416,369 B2
(45) Date of Patent: Sep. 16, 2025

(54) PNEUMATIC VALVE, AND VALVE ASSEMBLY HAVING AT LEAST ONE SUCH PNEUMATIC VALVE

(71) Applicant: Conti Temic microelectronic GmbH, Ingolstadt (DE)

(72) Inventors: Michael Beuschel, Stammham (DE); Stefan Bauer, Engelbrechtsmünster (DE); Gerhard Berghoff, Manching (DE)

(73) Assignee: Conti Temic microelectronic GmbH, Ingolstadt (DE)

( * ) Notice: Subject to any disclaimer, the term of this patent is extended or adjusted under 35 U.S.C. 154(b) by 9 days.

(21) Appl. No.: 18/632,993

(22) Filed: Apr. 11, 2024

(65) Prior Publication Data

US 2024/0344618 A1    Oct. 17, 2024

(30) Foreign Application Priority Data

Apr. 11, 2023  (DE) ...................... 10 2023 203 271.6

(51) Int. Cl.
| | |
|---|---|
| *F16K 7/14* | (2006.01) |
| *F16K 31/02* | (2006.01) |
| *F16K 31/126* | (2006.01) |

(52) U.S. Cl.
CPC ................ *F16K 31/02* (2013.01); *F16K 7/14* (2013.01); *F16K 31/1266* (2013.01); *F16K 31/1268* (2013.01)

(58) Field of Classification Search
CPC .... F16K 7/14; F16K 31/1266; F16K 31/1268; F16K 31/02; F16K 1/00; F16K 41/02
See application file for complete search history.

(56) References Cited

U.S. PATENT DOCUMENTS

| | | | | |
|---|---|---|---|---|
| 3,442,483 | A | * | 5/1969 | Schwartz ........... G05D 23/1921 |
| | | | | 137/877 |
| 3,613,732 | A | * | 10/1971 | Willson .................. F03G 7/066 |
| | | | | 60/527 |

(Continued)

FOREIGN PATENT DOCUMENTS

| | | |
|---|---|---|
| CN | 112066032 A | 12/2020 |
| CN | 112066040 A | 12/2020 |

(Continued)

OTHER PUBLICATIONS

Office Action dated Feb. 3, 2024 from corresponding German patent application No. 10 2023 203 271.6.

*Primary Examiner* — Umashankar Venkatesan (57) ABSTRACT

A pneumatic valve comprises an actuator with a movable closing element being disposed in a housing; the closing element with a tappet penetrating an actuator opening between an air chamber formed in the housing and an actuator chamber, and a plate, with a sealing element, for closing the supply opening, thereon, on that end of said tappet protruding into the air chamber, and an elastic element pressing the plate toward the actuator opening in an activated state; the actuator element configured to move, in a non-energized state, the activating element to press the tappet against a supply opening, and in an energized state to move the activating element so as not to exert force on the tappet so that the plate is pressed in the direction of the actuator opening by the elastic element. A sealing collar disposed about the tappet seals the air chamber from the actuator chamber.

20 Claims, 5 Drawing Sheets

(56) References Cited

U.S. PATENT DOCUMENTS

| | | | | |
|---|---|---|---|---|
| 4,250,924 | A * | 2/1981 | Sakakibara | F16K 31/0682 137/868 |
| 5,040,567 | A * | 8/1991 | Nestler | F16K 31/0682 251/129.16 |
| 6,499,509 | B2 * | 12/2002 | Berger | F15B 13/0438 137/596.17 |
| 6,929,019 | B2 * | 8/2005 | Weinmann | F16K 31/006 137/15.21 |
| 6,972,659 | B2 * | 12/2005 | von Behrens | E05B 47/0009 337/140 |
| 7,017,883 | B2 * | 3/2006 | Bayer | B60T 13/662 251/129.06 |
| 7,484,528 | B2 * | 2/2009 | Beyerlein | F16K 31/002 137/625.2 |
| 9,945,490 | B2 * | 4/2018 | Dankbaar | A61H 23/004 |
| 9,970,564 | B2 * | 5/2018 | Dankbaar | B60N 2/976 |
| 10,193,169 | B2 * | 1/2019 | Iaconis | H01M 8/04208 |
| 10,207,619 | B2 * | 2/2019 | Dankbaar | F16K 31/002 |
| 10,711,906 | B2 * | 7/2020 | Yamagata | H01M 8/04201 |
| 10,753,494 | B2 * | 8/2020 | Beuschel | F16K 11/052 |
| 10,890,268 | B2 * | 1/2021 | Dörfler | F16K 31/025 |
| 10,948,095 | B2 * | 3/2021 | Dörfler | F03G 7/06143 |
| 10,995,873 | B2 * | 5/2021 | Mitzler | B60N 2/914 |
| 11,047,497 | B2 * | 6/2021 | Beuschel | F03G 7/06143 |
| 11,047,501 | B2 * | 6/2021 | Leeseberg | F16K 31/0682 |
| 11,054,053 | B2 * | 7/2021 | Mitzler | F16K 31/025 |
| 11,073,219 | B2 * | 7/2021 | Dörfler | F03G 7/065 |
| 11,077,781 | B2 * | 8/2021 | Beuschel | F16K 31/1223 |
| 11,236,839 | B2 * | 2/2022 | Beuschel | F16K 31/025 |
| 11,635,154 | B2 * | 4/2023 | Beuschel | B60N 2/643 297/284.1 |
| 11,674,408 | B1 * | 6/2023 | Menheere | F16K 7/17 415/145 |
| 11,859,727 | B2 * | 1/2024 | Beuschel | B60N 2/914 |
| 11,953,114 | B2 * | 4/2024 | Zeng | F16K 31/025 |
| 11,982,369 | B2 * | 5/2024 | Wen | F16K 27/003 |
| 2018/0038514 | A1 * | 2/2018 | Kuszneruk | F16K 99/0044 |
| 2020/0101883 | A1 | 4/2020 | Beuschel et al. | |
| 2020/0103047 | A1 | 4/2020 | Beuschel et al. | |
| 2022/0325815 | A1 | 10/2022 | Beuschel et al. | |

FOREIGN PATENT DOCUMENTS

| | | |
|---|---|---|
| DE | 102005060217 B4 | 10/2008 |
| DE | 102018216874 A1 | 4/2020 |
| DE | 102018131802 A1 | 6/2020 |
| DE | 102019208051 A1 | 12/2020 |
| DE | 102019208051 B4 | 7/2022 |
| DE | 102018216874 B4 | 8/2022 |
| DE | 102018216876 B4 | 10/2022 |
| DE | 102021203190 A1 | 10/2022 |
| DE | 102022202438 A1 | 9/2023 |
| DE | 102022207882 B3 | 11/2023 |
| EP | 2239486 A1 | 10/2010 |
| EP | 2239486 B1 | 10/2011 |
| WO | 2014135909 A1 | 9/2014 |

* cited by examiner

PNEUMATIC VALVE, AND VALVE ASSEMBLY HAVING AT LEAST ONE SUCH PNEUMATIC VALVE

BRIEF DESCRIPTION OF THE DRAWINGS

The disclosure will be explained in more detail below by exemplary embodiments with the aid of figures. In the figures.

DETAILED DESCRIPTION

The disclosure relates to a pneumatic valve, having a housing in which an air chamber is formed with a supply opening for supplying compressed air, or another gas or fluid, into the air chamber, a connecting opening connected to the air chamber, and an actuator opening for connecting the air chamber to an actuator chamber; an actuator with a movable closing element being disposed in the housing; the closing element being configured with a tappet which penetrates the actuator opening, and a plate being formed on that end of said tappet that protrudes into the air chamber, a sealing element for closing the supply opening being disposed on said plate, and being formed with an elastic element which in the activated state of the pneumatic valve presses the plate in the direction toward the actuator opening; the actuator furthermore having: a circuit board disposed in the actuator chamber, an activating element which is disposed in the actuator chamber and has an activating portion for acting on the tappet, and a bending portion connected to the activating portion and the circuit board; and an actuator element which is disposed in the actuator chamber and has a first end mechanically connected to the activating portion, and a second end mechanically and electrically connected to the circuit board; the actuator element configured to, in a non-energized state, move the activating element to a first state in which it presses the tappet against the supply opening, and in an energized state to move the activating element to a second state in which the activating portion does not exert a force on the tappet so that the plate is pressed in the direction of the actuator opening by virtue of the effect of the elastic element. Compressed air, or another gas or fluid, is considered to generally be air, or another gas or fluid, that is at a pressure above the local ambient pressure. However, those skilled in the art will recognize other applicable scenarios where gases or fluids are compressed, for example, but not limited to, relative to partial pressures, without departing from the spirit of the invention.

In pneumatic valves known in the art fluid bubbles or air cushions connected to the connecting opening are emptied in the non-activated state of the valves, since there is an open connection between the connecting opening and the actuator opening and the actuator chamber has a connection to the environment in order to establish an ambient pressure in the actuator chamber. Thus, these are 3/2-way valves, which not only allow the air cushions to be vented, but also cause them in the non-activated state of the actuator.

Fillable elastic cushions are used to shape seat contours. For this purpose, the elastic cushions are usually filled with air. Electrically activated valves are used to control the air. The cushions may also be used for a massage function by periodically filling and emptying them. Two or more air cushions are activated for the massage function, which may be adjusted independently of each other or remain in a filled state while other cushions are filled or vented. Due to the short holding time of the air in a cushion when using a massage (a few seconds to approx. 10 min) in comparison to a contour adjustment, NO (normally open) valves are usually used for this purpose, which are in the venting position when they are not activated.

Increasingly, mid-range and low-end vehicles are also being equipped with such systems. Therefore, an ideally cost-effective version is desired. At the same time, vehicles are designed with a view to saving weight in order to meet environmental and consumption requirements. This results inter alia in a more compact construction mode of seats. This also means that the components installed therein preferably should be reduced in size.

In many embodiments such as, for example, pneumatic lumbar supports, independent 2/2-way valves may be used for filling and venting each cushion installed in a vehicle seat; consequently, each cushion may require two valve actuators. Alternatively, a combination such as 3/3 or 3/4-way valves may be used instead of two 2/2-way valves (likewise with two actuators). Shape memory alloy (SMA) elements, which have a particularly high power density, are increasingly used as actuators for pneumatic valves.

There are generally two variants for the placement of the SMA element in previous valves with SMA actuators. In a first group, there is a complete separation between fluid and the SMA element. This may be especially, but not only, desirable for hydraulics to avoid exposing the SMA element to severe cooling by the fluid.

In one variant separation takes place via a sliding annular seal, in another variant via an elastic membrane. The disadvantage here is the additional actuating force may be required by the actuator. In the case of an annular seal, this is due to the friction of the annular seal. In the case of the membrane, the pressure-effective surface area of the membrane is significantly larger than the actual nozzle opening, which may increase the required force and thus the size and/or cost of the actuator.

A second group uses an SMA element which is located within a pressure chamber through which the fluid flows. According to some examples, this pressure chamber is usually connected to the working connection of the valve. When the SMA actuators are activated, this pressure chamber is then optionally connected to the back pressure or the exhaust air. Alternatively, the pressure chamber in which the SMA element is located may be permanently connected to the back pressure. In both cases, the entire installation space in which the SMA element is located may need to be sealed in relation to the environment. This may require an appropriate seal (elastomer, adhesive or similar) as well as a way to absorb the occurring compressive forces, such as threaded connections, welds, etc. Costs are also incurred to contact the circuit board (or its region) in the pressure chamber from outside, e.g. via airtight feedthrough contacts, increased number of layers of a circuit board, or similar.

This often increases the installation space and the cost of the valve.

An SMA valve with pulling actuation of the valve element by a rod penetrating the vent valve is one of the example.

Alternatively, a sealing collar which seals the rod and the valve element in relation the housing opening, so that the SMA element is still located outside the pressurized region, but no air may escape via the opening for the tappet, is another example. However, this sealing collar also acts as a spring that closes the valve when the actuator is not activated. When the actuator is activated, it may therefore also apply the force to compress this sealing collar.

The object of the disclosure is to specify a pneumatic 2/2-way NC valve with an SMA actuator at ambient pressure, which is as simple, space-saving and cost-effective as possible. At the same time, the air flow through the valve should be sealed in relation to the environment. Moreover, it is also the intention to specify valve assemblies having such a pneumatic valve.

The object is achieved by a pneumatic valve disclosed herein.

Accordingly, in a pneumatic valve of the generic type a sealing collar which in each state seals the air chamber in relation to the actuator chamber is disposed about the tappet between the plate and the actuator opening.

As a result, the compressed air in the air cushion may not escape through the actuator opening into the actuator chamber and thus to the actuator element, which is configured as an SMA actuator, and potentially alter the latter in terms of its state by, for example, a change in pressure or temperature.

In an advantageous configuration of the pneumatic valve, the sealing collar is configured to be conical or double conical, as a result of which it is pressed against the plate of the tappet and about the actuator opening and increases the sealing action under the influence of pressure.

The double cone has a through-hole on the inside, through which the tappet is inserted.

In a further advantageous configuration of the pneumatic valve, the sealing collar has an inherent tension and by virtue of its inherent tension seals the air chamber in relation to the actuator chamber in each state.

In particular, in the case of a double cone shape, the sealing collar may be attached between the plate of the tappet and the wall of the air chamber so as to be preloaded when using an elastic material.

In a configuration of the pneumatic valve, the elastic element is disposed between the plate and that wall of the air chamber that comprises the actuator opening.

Alternatively, the elastic element may also or instead be disposed between a plate disposed on that end of the tappet that lies outside the air chamber and an external wall of the air chamber.

It may be desirable that when the SMA actuator is activated the tappet is pressed or pulled by the elastic element in the direction of the actuator opening counter to the spring force of the sealing collar, thus releasing the supply opening.

The elastic element may be formed with a spiral spring, but any other form of a spring, such as a disk spring or similar, is conceivable.

An advantageous valve assembly is formed with two pneumatic valves according to the disclosure, by connecting the connecting opening of a first valve to a compressed air connection of the valve assembly, and connecting the supply opening of the first valve to an air cushion connection of the valve assembly, and connecting the supply opening of a second valve to the air cushion connection of the valve assembly, and connecting the connecting opening of the second valve to an ambient port of the valve assembly.

Thus, a 3/3-way NC valve may be represented by the two 2/2-way NC valves. One of the 2/2-way valves serves for filling, and the other for venting. The sealing collar on the breather valve may also be dispensed with here.

A further valve assembly having at least one pneumatic valve according to the disclosure and a 3/2-way valve is formed, by connecting a supply opening of the 3/2-way valve to a compressed air connection of the valve assembly, and connecting a connecting opening of the 3/2-way valve to the connecting opening of the at least one pneumatic valve, and connecting the supply opening of the at least one pneumatic valve to the air cushion connection of the valve assembly, and connecting an actuator opening of the 3/2-way valve to an ambient port of the valve assembly.

In this alternative valve assembly, the consumer, for example an air cushion, may be filled with air when both valves are activated. For venting, on the other hand, it may be that only the 2/2-way valve according to the disclosure is activated; the air then escapes into the environment via the vent opening of the non-activated 3/2-way valve. In this way, even a single 3/2-way valve may also serve as a pilot valve for a plurality of 2/2-way valves disposed in parallel, and their consumers.

For this purpose, at least two pneumatic valves according to the disclosure are connected by their connecting openings to the connecting opening of the 3/2-way valve so that the 3/2-way valve functions as a pilot valve.

Figure 1:
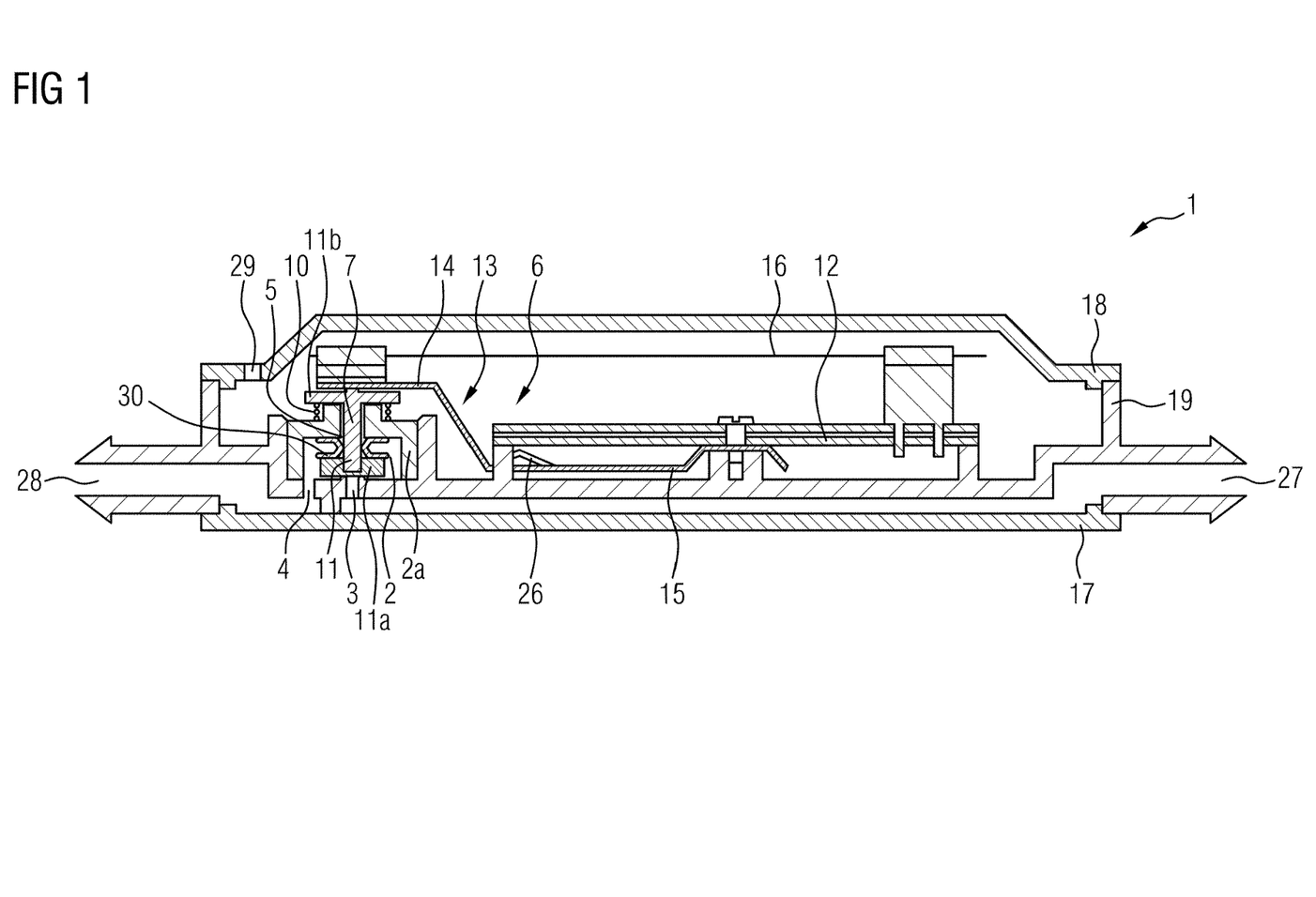
FIG. 1 shows a first exemplary variant of configuration of a pneumatic valve according to the disclosure in a non-activated state.

FIG. 1 shows an exemplary pneumatic valve in a cross-sectional illustration, which is formed with a housing 1 that has a first housing part 17 formed as a base plate in the illustrated embodiment. The housing 1 moreover has a second housing part 18 which is formed as a cover, and finally a third cup-shaped housing part 19 which is formed as an insert part between the first and the second housing part 17, 18 and on which a supply port 27 and a connecting port 28 are integrally formed. An actuator chamber in which an actuator 6 is installed is formed between the third housing part 19 and the second housing part 18.

An air chamber 2 is formed on the third housing part 19, in that the latter has pot-shaped molding into which is inserted an end part 2a as a cover of the air chamber 2. The connection between the pot-shaped molding and the end part 2a is performed for example, by a press fit or a seal. It may be advantageous for compressive and sealing forces to be absorbed by clips, screws, etc.

The air chamber 2 has a supply opening 3, a connecting opening 4 and an actuator opening 5. In the illustrated exemplary embodiment, the supply opening 3 and the connecting opening 4 are formed in the third housing part 19, and the actuator opening 5 is formed in the end part 2a terminating the air chamber 2. Thus, compressed air, for example from a compressor 1, may be routed via the supply port 27 into the housing 1, whereby the compressed air may reach the air chamber 2 via the supply opening 3, and from there via the connecting opening 4 and the connecting port 28 into an air cushion connectable thereto. On the other hand, compressed air from the air cushion may reach the air chamber 2 via the connecting port 28 and the connecting opening 4, and from there back to the supply opening, and be discharged if there is no higher pressure prevalent at the latter.

Formed in the air chamber 2 is a closing element 7 having a tappet 11, a plate 11*a* being disposed or integrally molded on that end that protrudes into the air chamber 2.

A further plate 11*b* is fastened to or integrally molded on that end of the tappet 11 that protrudes from the air chamber 2, an elastic element 10, for example in the form of a spiral spring, being supported on said further plate 11*b*. The elastic element 10 is supported by its other end on the end part 2*a*. When the valve is activated, the elastic element 10 presses the closing element 7 away from the supply opening 3 and thus opens the latter.

A sealing collar 30 is disposed about the tappet 11 in the air chamber 2, between the plate 11*a* and the air chamber wall, in particular the end part 2*a*, and seals the actuator opening 5 so that the pressure in the air chamber 2 may not be equalized in the actuator chamber defined by the housing parts 18 and 19. In this way, air in an air cushion connected to the connecting port 28 may not escape via the actuator opening 5, neither in the activated nor in the non-activated state of the valve.

Figure 5:
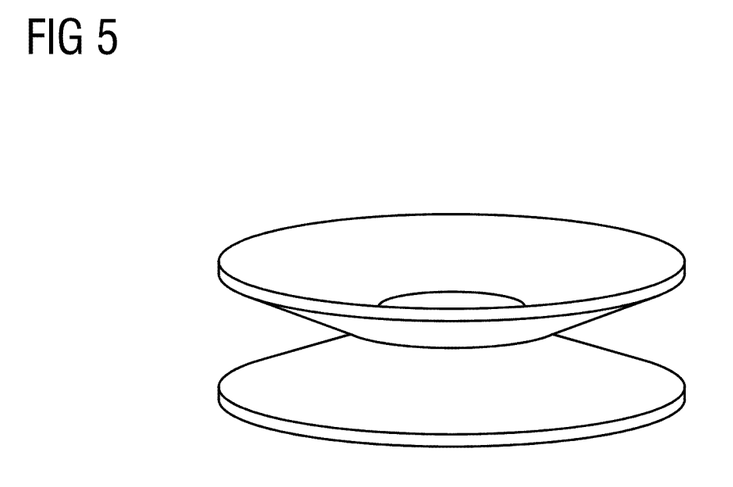
FIG. 5 shows an exemplary double cone sealing collar.
Figure 6:
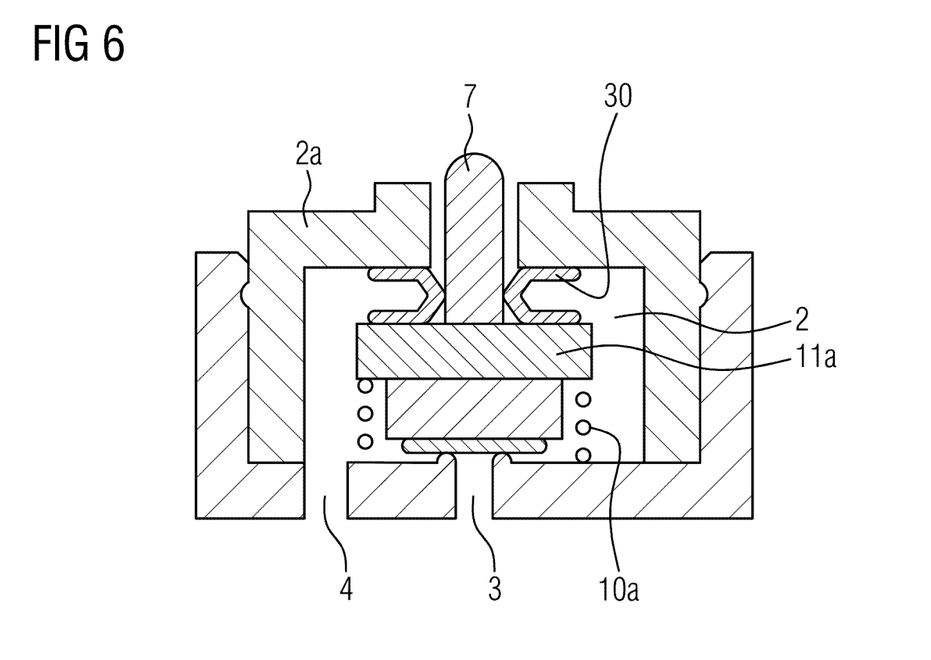
FIG. 6 shows a detailed illustration of an exemplary air chamber with a sealing collar.

The sealing collar 30 here is advantageously formed as a double cone with an inner bore for the tappet 11, and shown in one embodiment in the perspective illustration in FIG. 5. According to FIG. 6, at an overpressure in the air chamber 2, the sealing collar 30, in addition to its pre-load, is pressed against the plate 11*a* and the end part 2*a* of the air chamber 2.

Moreover, an actuator 6 is disposed in the housing 1. The actuator 6 is formed with a circuit board 12 which is mounted and mechanically connected on corresponding struts of the third housing part 19. An activating element 13, which has an activating portion 14 that is in, preferably direct, contact with the tappet 11 and has a bending portion 15 connected to the circuit board 12, is connected to the circuit board 12.

The actuator 6 further has an actuator element 16, which is preferably formed with a wire of a shape memory alloy, said wire contracting when impinged with a current supplied by a circuit (not illustrated) on the circuit board 12. In the non-activated state, the activating element 13 is pre-loaded so that the activating element 13 presses by its activating portion 14 against the tappet 11, and thus presses the plate 11*a* and an optionally attached sealing element counter to the force of the elastic element 10 onto the supply opening 3, as a result of which the actuator opening 5 is opened but sealed by the sealing collar 30.

The actuator element 16 is connected to both the activating element 13 and the circuit board 12—for example by crimp connections.

Advantageously, the actuator element 16 is formed above an upper side 20 of the circuit board 12, and the activating element 13 is formed below a lower side 21 of the circuit board 12, so that a very compact construction mode results. In principle, the structure may also be mirror-inverted, so that the actuator element 16 comes to lie below the circuit board 12, and the activating element 13 comes to lie above the circuit board 12.

Advantageously, an end position detection element 26 is formed on the activating element 13, which comes into contact with the circuit board 12 when the actuator 6 is activated and enables a current flow, as a result of which it is detected that the end position is reached, so that the current may be switched off or at least reduced by the actuator element 16 in order not to overload the latter.

Figure 2:
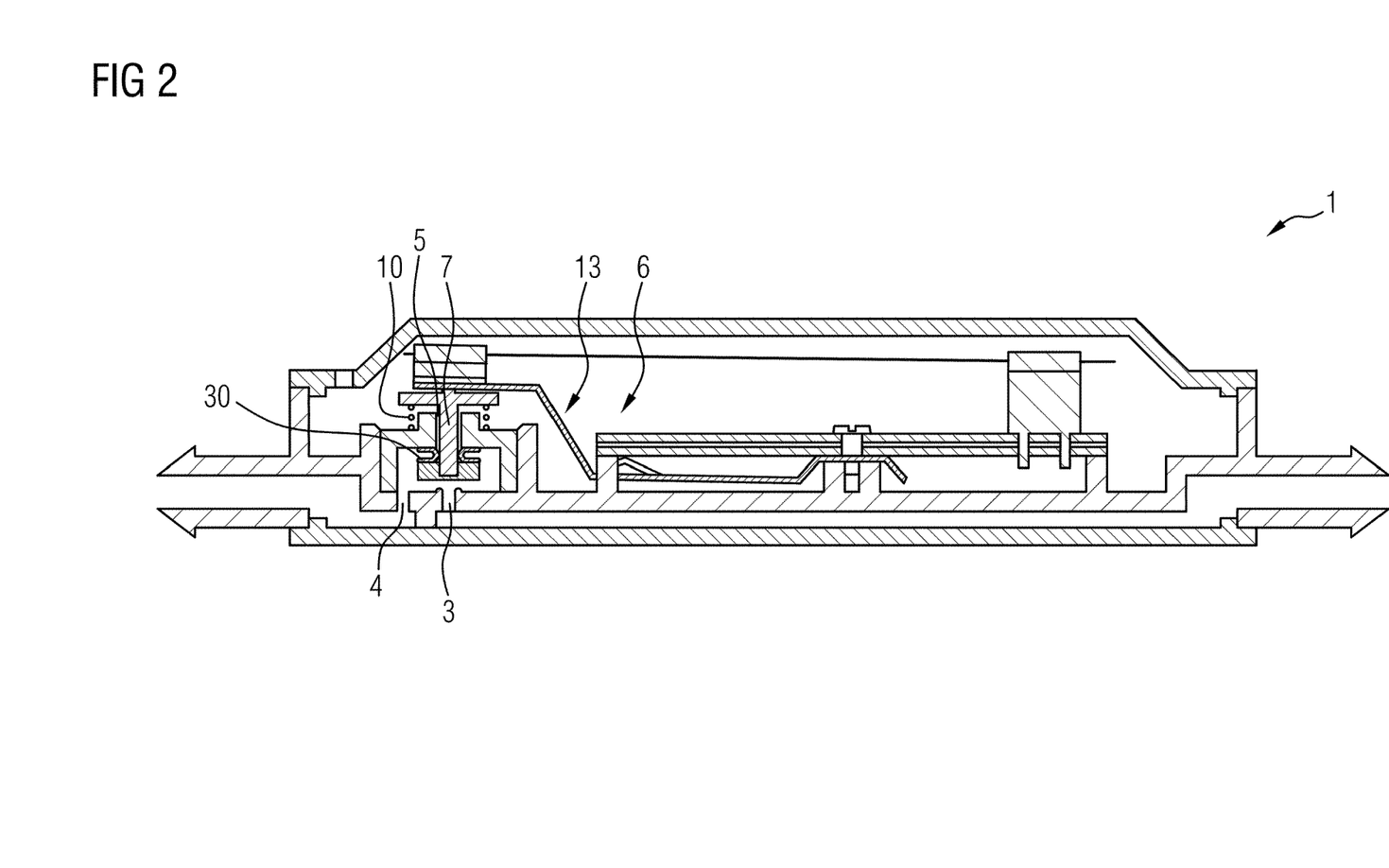
FIG. 2 shows the first exemplary variant of configuration of the valve in the activated state during a filling procedure.

In FIG. 2, the valve of FIG. 1 is shown in a second, activated state, thus in a state in which the supply opening 3 is open and air may flow from the supply opening 27 via the connecting opening 28 through the air chamber 2 into a connected air cushion.

In FIG. 2, identical parts are provided with the same reference signs as in FIG. 1, wherein only the more substantial reference signs are shown for reasons of clarity.

By activating the actuator 6, the activating element 13 is raised, and in this way the closing element 7 is likewise pushed upward by the spring force of the elastic element 10, and the sealing collar 30 is consequently compressed. The closing element 7 no longer presses on the plate 11*a*, so that the latter is raised by the air pressure and releases the supply opening 3.

Figure 3:
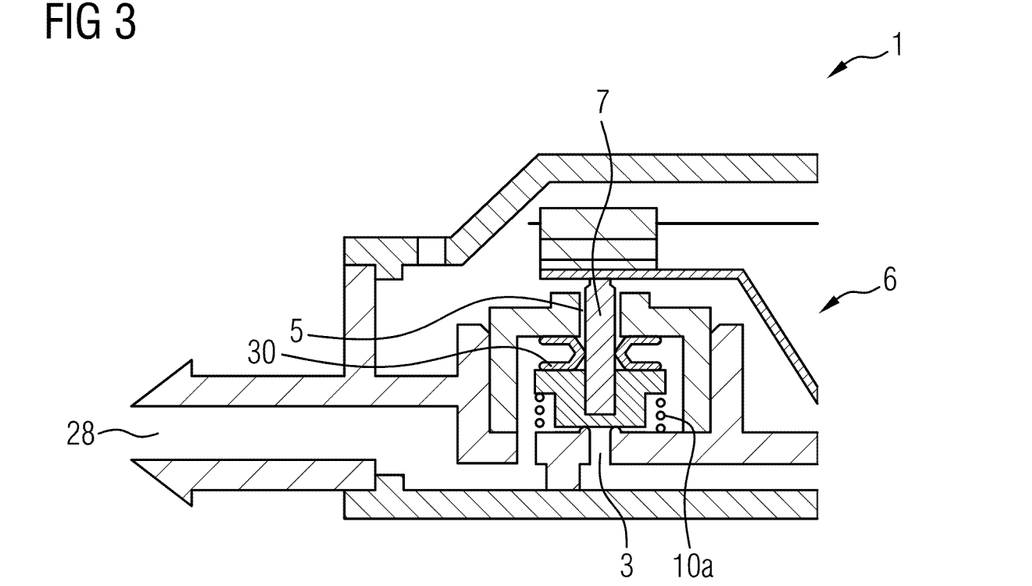
FIG. 3 shows a second exemplary variant of configuration of a pneumatic valve according to the disclosure in a non-activated state.
Figure 4:
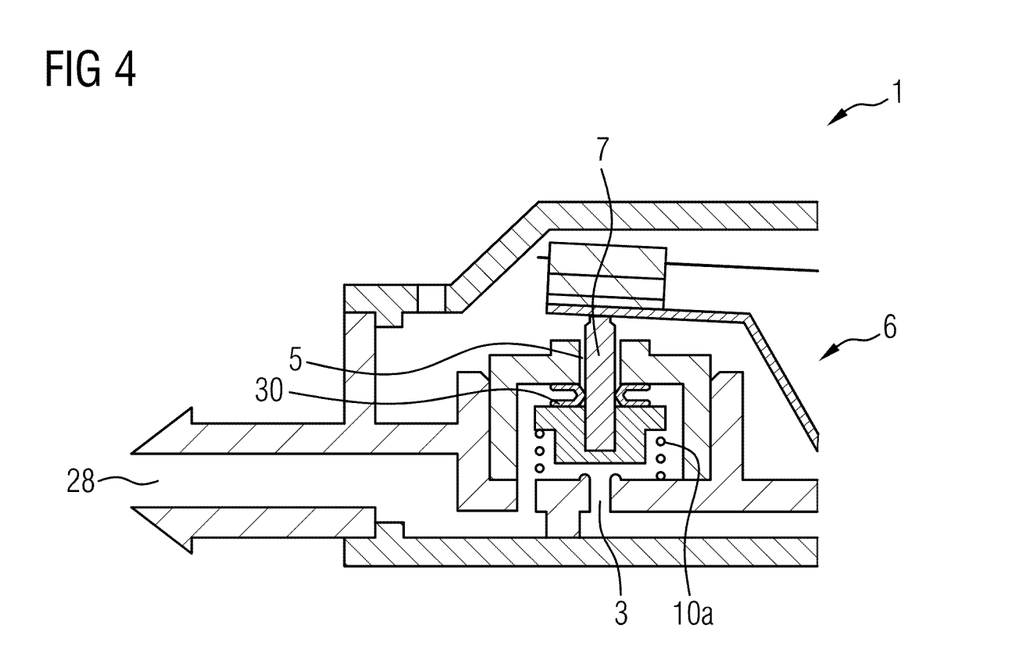
FIG. 4 shows the second exemplary variant of configuration of the valve in the activated state during a filling procedure.

A second embodiment of a pneumatic valve is illustrated in FIGS. 3 and 4. Here, too, identical parts are provided with the same reference signs as in FIGS. 1 to 3.

In the second embodiment, the elastic element 10*a* is now disposed between the plate 11*a* attached to that end of the tappet 11 that protrudes into the air chamber 2, and the base of the air chamber 2, and is compressed onto the tappet 11 by virtue of the force of the activating element 13.

The same two states as in FIGS. 1 and 2 are illustrated in FIGS. 3 and 4; the difference being in the arrangement of the elastic element 10*a*.

Figure 7:
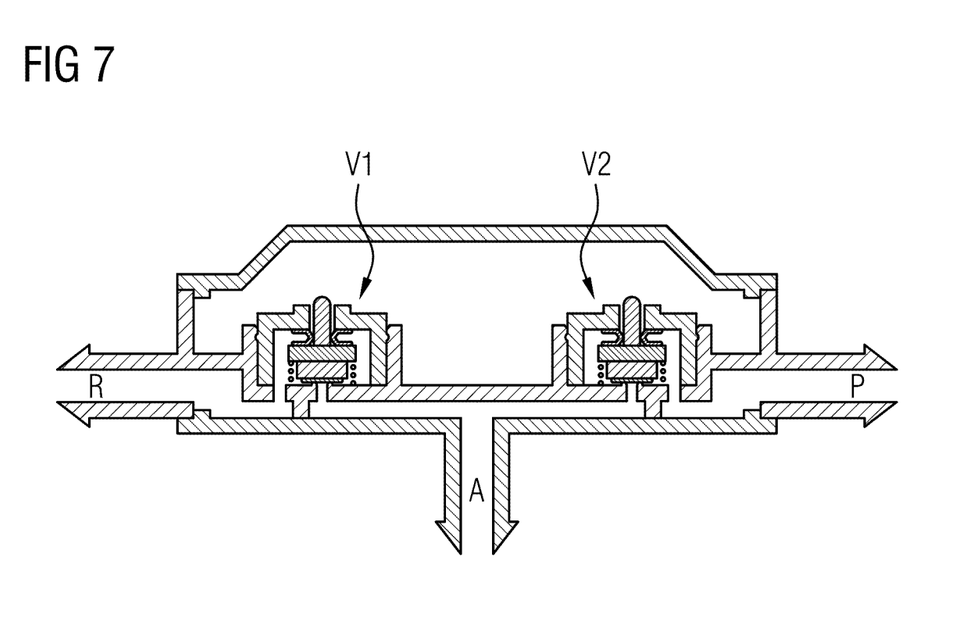
FIG. 7 shows an exemplary embodiment of a valve assembly.

FIG. 7 shows a valve assembly having two pneumatic valves, as illustrated in FIGS. 3 and 4; valves according to the embodiment of FIGS. 1 and 2 may also be used. The connecting opening of a second valve V2 is connected to a compressed air connection P of the valve assembly, and the connecting opening of the second valve V2 is connected to an air cushion connection A of the valve assembly. The supply opening of the second valve V2 is connected to the supply opening of the first valve V1, and the connecting opening of the first valve is connected to an ambient port R of the valve assembly.

With this switching diagram of the two 2/2-way NC valves, a 3/3-way NC valve in which the second valve V2 is used to fill an air cushion connected to the air cushion connection A and the first valve V1 is used to vent said air cushion, is implemented.

Figure 8:
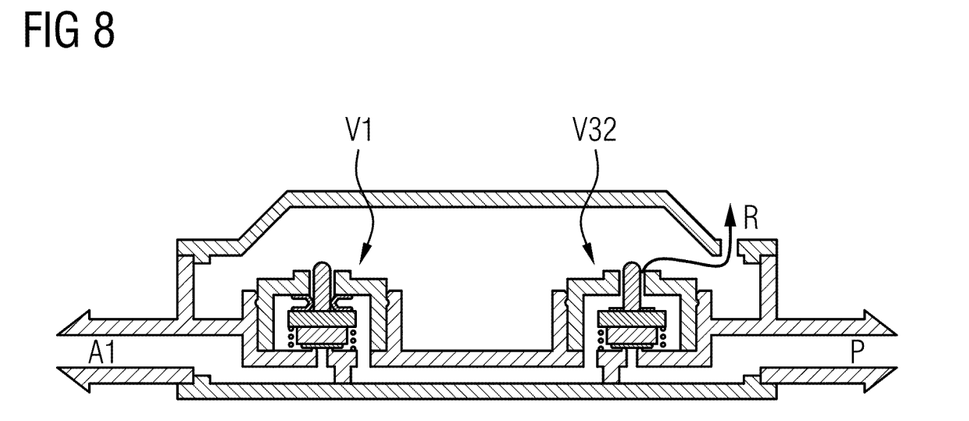
FIG. 8 shows another exemplary embodiment of a valve assembly.

A further valve assembly having at least one pneumatic valve V1 with a sealing collar 30 and a 3/2-way valve V32, by which a 3/2-way NC valve is implemented is illustrated in FIG. 8. There, a supply opening of the 3/2-way valve V32 is connected to a compressed air connection P of the valve assembly, and a connecting opening 4 of the 3/2-way valve V32 is connected to the connecting opening 4 of the at least one pneumatic valve V1, and the supply opening 3 of the at least one pneumatic valve V1 is connected to the air cushion connection A1 of the valve assembly. An actuator opening of the 3/2-way valve V32 is connected to an ambient port R of the valve assembly.

In this design embodiment of a valve assembly, it is possible that at least two pneumatic valves V1 with a sealing collar, as described above, are connected by their connecting openings to the connecting opening of the 3/2-way valve V32 in so that the 3/2-way valve V32 acts as a pilot valve for this number of valves V1.

Clause 1. A pneumatic valve, having a housing in which is formed an air chamber with a supply opening for supplying compressed air, or another gas or fluid, into the air chamber, a connecting opening connected to the air chamber, and an actuator opening for connecting the air chamber to an actuator chamber; an actuator with a movable closing element being disposed in the housing; the closing element being configured with a tappet which penetrates the actuator opening, and a plate being formed on that end of said tappet that protrudes into the air chamber, a sealing element for closing the supply opening being disposed on said plate, and being formed with an elastic element which in the activated state of the pneumatic valve presses the plate in the direction toward the actuator opening; the actuator furthermore having: a circuit board disposed in the actuator chamber; an activating element which is disposed in the actuator chamber and has an activating portion for acting on the tappet, and a bending portion connected to the activating portion and the circuit board; and an actuator element which is disposed in the actuator chamber and has a first end mechanically connected to the activating portion, and a second end mechanically and electrically connected to the circuit board; the actuator element in a non-energized state being configured to move the activating element to a first state in which it presses the tappet against the supply opening, and in an energized state to move the activating element to a second state in which the activating portion does not exert any force on the tappet in such way that the plate is pressed in the direction of the actuator opening by virtue of the effect of the elastic element, wherein a sealing collar which in each state seals the air chamber in relation to the actuator chamber is disposed about the tappet between the plate and the actuator opening.

Clause 2. The pneumatic valve as claimed in clause 1, wherein the sealing collar is configured to be conical or double conical.

Clause 3. The pneumatic valve as claimed in clause 1 or 2, wherein the sealing collar has an inherent tension and by virtue of this inherent tension, the air chamber seals in relation to the actuator chamber in each state.

Clause 4. The pneumatic valve as claimed in one of clauses 1 to 3, wherein the elastic element is disposed between the plate and that wall of the air chamber that comprises the supply opening.

Clause 5. The pneumatic valve as claimed in one of clauses 1 to 3, wherein the elastic element is disposed between a plate disposed on that end of the tappet that lies outside the air chamber and an external wall of the air chamber.

Clause 6. The pneumatic valve as claimed in one of the preceding clauses, wherein the elastic element is formed with a spiral spring.

Clause 7. A valve assembly having two pneumatic valves as claimed in one of clauses 1 to 6, in which the connecting opening of a first valve is connected to a compressed air connection of the valve assembly, and the supply opening of the first valve is connected to an air cushion connection of the valve assembly and the supply opening of a second valve with the air cushion connection of the valve assembly, and the connecting opening of the second valve is connected to an ambient port of the valve assembly.

Clause 8. A valve assembly having at least one pneumatic valve as claimed in one of clauses 1 to 6, and a 3/2-valve, in which a supply opening of the 3/2-way valve is connected to a compressed air connection of the valve assembly, and a connecting opening of the 3/2-way valve is connected to the connecting opening of the at least one pneumatic valve, and the supply opening of the pneumatic valve is connected to the air cushion connection of the valve assembly, and an actuator opening of the 3/2-way valve is connected to an ambient port of the valve assembly.

Clause 9. The valve assembly as claimed in clause 8, in which at least two pneumatic valves as claimed in one of clauses 1 to 6 by their connecting openings are connected to the connecting opening of the 3/2-way valve so that the 3/2-way valve functions as a pilot valve.

The invention claimed is:

1. A pneumatic valve, having a housing in which is formed an air chamber with a supply opening for supplying compressed air, or another gas or fluid, into the air chamber, a connecting opening connected to the air chamber, and an actuator opening for connecting the air chamber to an actuator chamber;
   an actuator with a movable closing element being disposed in the housing;
   the closing element being configured with a tappet which penetrates the actuator opening, and a plate being formed on that end of said tappet that protrudes into the air chamber, a sealing element for closing the supply opening being disposed on said plate, and being formed with an elastic element which in an activated state of the pneumatic valve presses the plate in a direction toward the actuator opening;
   the actuator further comprising:
   a circuit board disposed in the actuator chamber;
   an activating element which is disposed in the actuator chamber and has an activating portion for acting on the tappet, and a bending portion connected to the activating portion and the circuit board; and
   an actuator element which is disposed in the actuator chamber and has a first end mechanically connected to the activating portion, and a second end mechanically and electrically connected to the circuit board;
   the actuator element in a non-energized state being configured to move the activating element to a first state in which it presses the tappet against the supply opening, and in an energized state to move the activating element to a second state in which the activating portion does not exert a force on the tappet in such way that the plate is pressed in the direction of the actuator opening by virtue of an effect of the elastic element,
   wherein a sealing collar which seals the air chamber in relation to the actuator chamber is disposed about the tappet between the plate and the actuator opening.

2. The pneumatic valve as claimed in claim 1, wherein the sealing collar is configured to be conical or double conical.

3. The pneumatic valve as claimed in claim 2, wherein the sealing collar has an inherent tension and by virtue of this inherent tension, the air chamber seals in relation to the actuator chamber.

4. The pneumatic valve as claimed in claim 3, wherein the elastic element is disposed between the plate and that wall of the air chamber that comprises the supply opening.

5. The pneumatic valve as claimed in claim 3, wherein the elastic element is disposed between a plate disposed on that end of the tappet that lies outside the air chamber and an external wall of the air chamber.

6. The pneumatic valve as claimed in claim 5, wherein the elastic element is formed with a spiral spring.

7. A valve assembly having two pneumatic valves as claimed in claim 6, in which the connecting opening of a first valve is connected to a compressed air connection of the valve assembly, and the supply opening of the first valve is connected to an air cushion connection of the valve assembly and the supply opening of a second valve with the air cushion connection of the valve assembly, and the connecting opening of the second valve is connected to an ambient port of the valve assembly.

8. A valve assembly having at least one pneumatic valve as claimed in claim 6, and a 3/2-valve, in which a supply opening of the 3/2-way valve is connected to a compressed air connection of the valve assembly, and a connecting opening of the 3/2-way valve is connected to the connecting opening of the at least one pneumatic valve, and the supply opening of the pneumatic valve is connected to an air cushion connection of the valve assembly, and an actuator opening of the 3/2-way valve is connected to an ambient port of the valve assembly.

9. The valve assembly as claimed in claim 8, in which at least two pneumatic valves are connected via their connecting openings to the connecting opening of the 3/2-way valve so that the 3/2-way valve functions as a pilot valve.

10. The pneumatic valve as claimed in claim 2, wherein the elastic element is disposed between the plate and that wall of the air chamber that comprises the supply opening.

11. The pneumatic valve as claimed in claim 2, wherein the elastic element is disposed between a plate disposed on that end of the tappet that lies outside the air chamber and an external wall of the air chamber.

12. The pneumatic valve as claimed in claim 2, wherein the elastic element is formed with a spiral spring.

13. A valve assembly having two pneumatic valves as claimed in claim 2, in which the connecting opening of a first valve is connected to a compressed air connection of the valve assembly, and the supply opening of the first valve is connected to an air cushion connection of the valve assembly and the supply opening of a second valve with the air cushion connection of the valve assembly, and the connecting opening of the second valve is connected to an ambient port of the valve assembly.

14. The pneumatic valve as claimed in claim 1, wherein the sealing collar has an inherent tension and by virtue of this inherent tension, the air chamber seals in relation to the actuator chamber.

15. The pneumatic valve as claimed in one of claim 1, wherein the elastic element is disposed between the plate and that wall of the air chamber that comprises the supply opening.

16. The pneumatic valve as claimed in claim 1, wherein the elastic element is disposed between a plate disposed on that end of the tappet that lies outside the air chamber and an external wall of the air chamber.

17. The pneumatic valve as claimed in claim 1, wherein the elastic element is formed with a spiral spring.

18. A valve assembly having two pneumatic valves as claimed in claim 1, in which the connecting opening of a first valve is connected to a compressed air connection of the valve assembly, and the supply opening of the first valve is connected to an air cushion connection of the valve assembly and the supply opening of a second valve with the air cushion connection of the valve assembly, and the connecting opening of the second valve is connected to an ambient port of the valve assembly.

19. A valve assembly having at least one pneumatic valve as claimed in claim 1, and a 3/2-valve, in which a supply opening of the 3/2-way valve is connected to a compressed air connection of the valve assembly, and a connecting opening of the 3/2-way valve is connected to the connecting opening of the at least one pneumatic valve, and the supply opening of the pneumatic valve is connected to an air cushion connection of the valve assembly, and an actuator opening of the 3/2-way valve is connected to an ambient port of the valve assembly.

20. The valve assembly as claimed in claim 19, in which at least two pneumatic valves are connected via their connecting openings to the connecting opening of the 3/2-way valve so that the 3/2-way valve functions as a pilot valve.

* * * * *